United States Patent [19]

Dyott et al.

[11] Patent Number: 5,444,534
[45] Date of Patent: Aug. 22, 1995

[54] COIL MOUNTING ARRANGEMENT FOR FIBER OPTIC GYROSCOPE

[75] Inventors: Richard B. Dyott, Oak Lawn, Ill.; Eric L. Brooker, Marietta, Ga.; Sidney M. Bennett, Chicago; John D. Myhre, Western Springs, both of Ill.

[73] Assignee: Andrew Corporation, Orland Park, Ill.

[21] Appl. No.: 174,184

[22] Filed: Dec. 27, 1993

[51] Int. Cl.[6] ........................................... G01C 19/64
[52] U.S. Cl. ................................................ 356/350
[58] Field of Search ........................................ 356/350

[56] References Cited

U.S. PATENT DOCUMENTS

| | | | |
|---|---|---|---|
| 4,699,451 | 10/1987 | Mohr | 356/350 |
| 4,702,599 | 10/1987 | Mohr | 356/350 |

FOREIGN PATENT DOCUMENTS

| | | |
|---|---|---|
| WO83/00552 | 2/1983 | WIPO . |
| WO92/08106 | 5/1992 | WIPO . |
| 05273415 | 10/1993 | Japan . |
| 05215559 | 8/1993 | Japan . |
| 2146428 | 4/1985 | United Kingdom . |
| 0391557 | 10/1990 | Europe . |
| 61217011 | 9/1986 | Japan . |

OTHER PUBLICATIONS

Kaminow "Polarization in Optical Fibers", IEEE Journal of Quantum Electronics, vol. QE-17, No. 1, Jan. 1981.

Dow Corning® Q3-6575 Silicone Dielectric Gel "New Product Information" flyer (1984).

Craig et al. "Interlaboratory Comparison of Polarization-Holding Parameter Measurements on High Birefringence Optical Fiber", Nat. Inst. of Standards and Technology (undated).

*Primary Examiner*—Vincent P. McGraw
*Attorney, Agent, or Firm*—Arnold, White & Durkee

[57] ABSTRACT

The sensing coil of a fiber optic gyroscope is mounted by submerging the coil in a gel which surrounds and supports the coil. The components attached to the coil, such as the directional coupler(s) and polarizer, may also be submerged in the gel. The gel is contained by a rigid housing, in which the walls of the housing are spaced away from the coil. The intervening space between the coil and the innermost walls of the housing are filled with the gel, and the gel may be bonded to those innermost walls. The gel remains stiff enough to maintain the coil in a fixed position relative to the housing, and soft enough to avoid any significant effect on the h of the coil over the operating temperature range. In a modified form, the optical-fiber sensing coil is wound around a bobbin that has a layer of gel on the coil-supporting surface. A coating of adhesive is applied to the outside surfaces of the coil to hold the coil windings together in a stable configuration around the layer of gel.

18 Claims, 5 Drawing Sheets

COIL MOUNTING ARRANGEMENT FOR FIBER OPTIC GYROSCOPE

FIELD OF THE INVENTION

The present invention relates generally to fiber optic gyroscopes and, more particularly, to mounting arrangements for the sensing coil and other components in a fiber optic gyroscope.

BACKGROUND OF THE INVENTION

A fiber optic gyroscope measures the rotation of a sensing coil by detecting the Sagnac phase shift between two counter-propagating light waves in the sensing coil.

The mounting of the sensing coil in a fiber optic gyroscope is critical for a number of reasons. Because the gyroscope must be capable of sensing extremely small movements in the coil, the coil should be mounted in a way that isolates the coil from stresses that might cause localized disturbances in the fiber which forms the coil. Such localized disturbances can modify the light wave in a manner that can be mistaken for rotation of the coil. The coil must also remain stable in a fixed position so as to avoid the generation of spurious signals due to movement of the coil relative to the structure on which it is mounted. Moreover, the isolation and fixed position of the coil must usually be maintained over a relatively wide temperature range, e.g., from $-55°$ C. to $+85°$ C.

In interferometric and resonant fiber optic gyroscopes, optical power is injected into both ends of the coil by a directional coupler, and exits the coil through the same directional coupler. The Sagnac ring (coil) in these gyroscopes is often made of single-mode, polarization-maintaining fiber, to ensure that light energy propagates along the length of the coil in the same polarization that it originally had at the directional coupler interface. Polarization maintenance is characterized by the h-parameter.

There also exist Sagnac rings made of single-mode (non-polarization maintaining) fiber where the optical power is de-polarized, typically by a Lyott depolarizer. Since the depolarization is often imperfect, changes in the birefringence of the coil fiber and movement of the coil with respect to its mounting can result in effects analogous to those described for polarization-maintaining fiber coils.

As is well-known in the art, the extinction ratio (ER) of a sensing coil is a measure of the polarization-holding properties of the coil. More specifically, the value of ER is a measure of the number of dB's between the intensity of an optical signal having the desired polarization and the intensity of an optical signal having polarization that is orthogonal to the desired polarization, after the desired optical signal has been propagated through a given length of optical fiber. The extinction ratio of a coil of length l is related to the h-parameter of the fiber, where h is defined as the extinction ratio per meter of fiber.

Thus $$ER = 10\ log_{10} h + 10\ log_{10} l,\ dB$$

The h-parameter of a fiber is usually measured by determining the extinction ratio of a sample length of fiber, perhaps 100 meters, wound loosely on a large diameter form. Thus the h-parameter can be defined as $$h = \frac{P_{min}}{l_{test} P_{max}}$$

where $l_{test}$ test is the length of the test sample and $P_{min}$ and $P_{max}$ are the optical powers measured through the fiber with crossed polarizers and aligned polarizers, respectively. Thus $P_{max}$ represents the wanted signal level, and $P_{min}$ represents the unwanted (cross-polarized) signal level. Alternatively, the h-parameter is expressed in dB-meters, and is defined as $$H = 10\ log_{10} h$$

A typical value of H is $-45$ dB-m.

The value of the h-parameter is a function of a number of factors such as the fiber construction, the protective (buffer) coating applied over the fiber, and external stresses. When the fiber is wound into a coil, the resultant extinction ratio depends on the size and winding of the coil and the method of mounting the coil in the gyroscope. The performance can be described in terms of ER, but it is perhaps better to use h, since coils of differing lengths and diameters are used to achieve specific product specifications. A poor h-parameter value (closer to 1.0) is manifested as gyro drift, which arises from unwanted coupling between the two polarization modes. This coupling is typically random in nature, but can have temperature-dependent effects.

Degradation of the h-parameter is caused primarily by forces transmitted through the buffer coating to the silica cladding of the fiber. These stresses are applied to the core, and if they are asymmetrical, will produce a change in the birefringence, which is the difference in the propagation constant of the light in each of the two characteristic polarizations. It is believed that the spatial frequency spectrum of the birefringence perturbations having a component at the beat length results in coupling of energy between the two modes. In coils, the undesired stresses and resultant coupling are often most intense where fibers cross each other. In addition, significant temperature dependencies can be caused by changes in the modulus of elasticity of the buffer coating (if it is a plastic-like material) and the differing thermal coefficients of expansion of the buffer and the fiber.

Typically Sagnac ring coils are wound on a form made of metal, plastic, or ceramic material. The objective is to provide a means of holding the coil in place when mounted in the mechanical package for the gyroscope, and to accurately locate the axis of the coil, as the fiber optic gyro is sensitive only to rotations about this axis. The coil form is typically either a cylinder or a flanged reel, and both introduce stresses, particularly as the temperature changes. Even at room temperature, the first layer of the coil often suffers from the forces associated with contact with the form, and the winding tension and pattern can have substantial effects on the h-parameter. Usually the coil form has a higher coefficient of thermal expansion than the fiber in the coil. Consequently, as the temperature increases, the radius of the form increases faster than that of the fiber, thereby increasing the radial pressure on the fiber. This results in a degradation in h. When the temperature decreases, the height of the flanged cylinder decreases, causing the flanges to press against the top and bottom surfaces of the coil. Encapsulation methods employing materials with a high Young's modulus, such as silicone rubber, also apply significant forces to the coil, due to the volumetric change during curing, and as a consequence of differential thermal expansion.

SUMMARY OF THE INVENTION

The primary objective of the present invention is to provide a coil mounting arrangement which overcomes the problems described above by supporting the coil on a gel, preferably by submerging the optical-fiber coil in a gel which surrounds and supports the coil. The components attached to the coil, such as the directional coupler(s) and polarizer, may also be submerged in the gel. The stiffness or Young's modulus of the gel preferably remains within a desired range over the operating temperature range of the gyroscope. Specifically, the gel should remain stiff enough to maintain the coil in a fixed position relative to the housing which contains the gel, and soft enough to avoid any significant effect on the h of the coil over the operating temperature range. The gel is preferably contained by a rigid housing, in which the walls of the housing are spaced away from the coil. The intervening space between the coil and the innermost walls of the housing are filled with the gel, and the gel may be bonded to those innermost walls.

In a modified form of the invention, the optical-fiber sensing coil is wound around a bobbin that has a layer of gel on the coil-supporting surface. A coating of adhesive is preferably applied to the outside surfaces of the coil to hold the coil windings together in a stable configuration around the layer of gel.

DETAILED DESCRIPTION OF PREFERRED EMBODIMENTS

Figure 1:
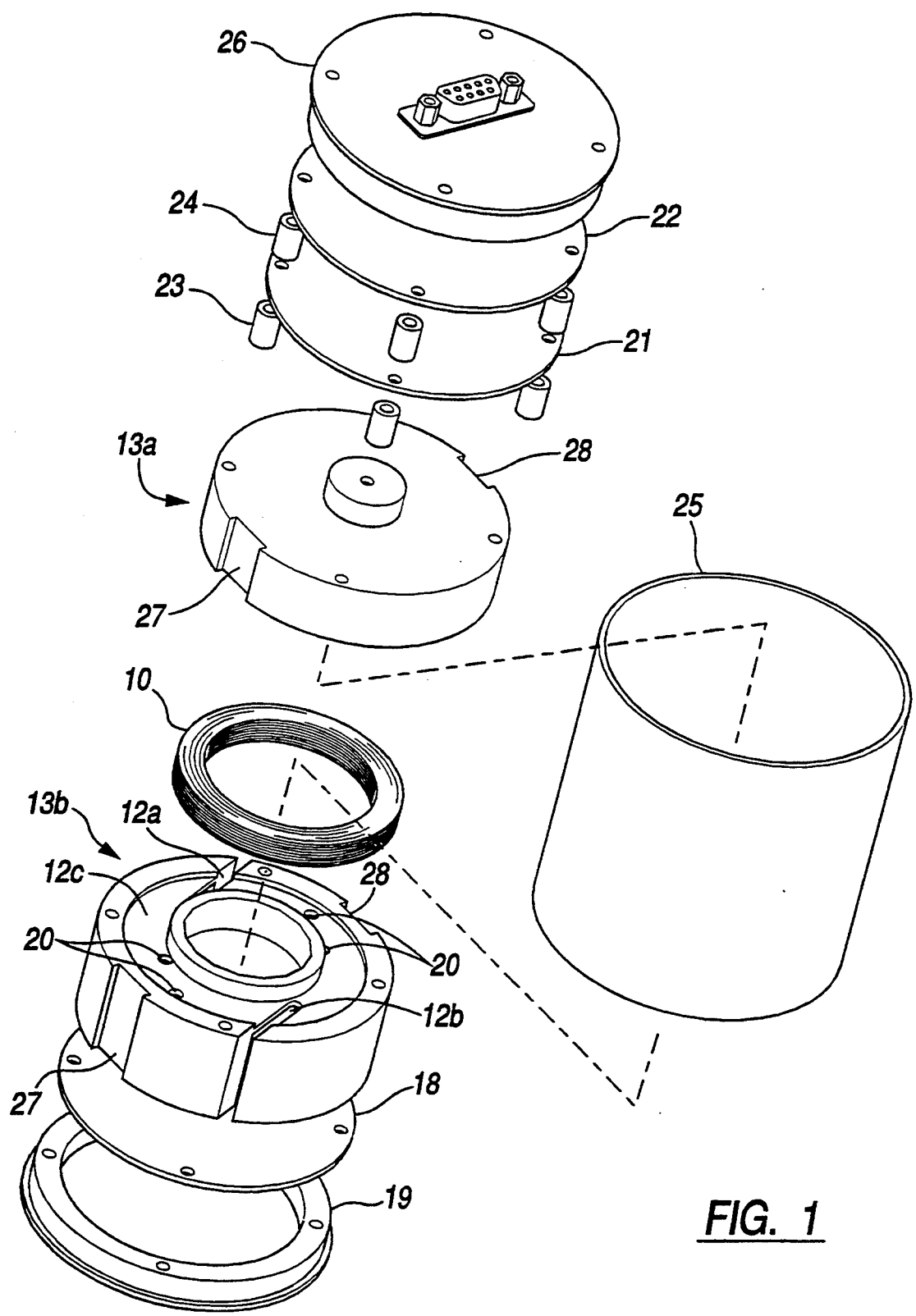
FIG. 1 is an exploded perspective view of a fiber optic gyroscope sensing coil mounted in accordance with the present invention.
Figure 2:
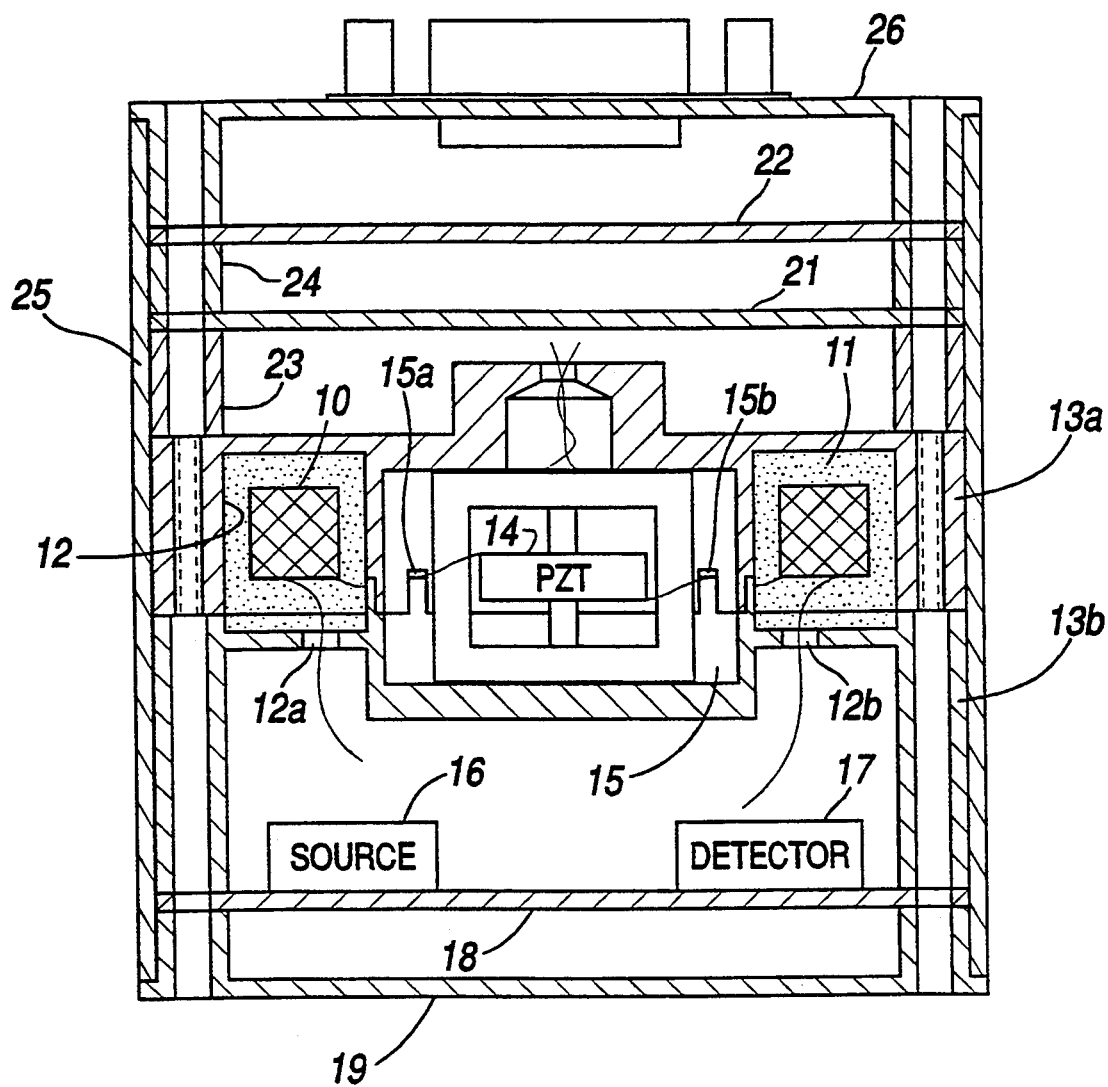
FIG. 2 is an enlarged vertical sectional view of the sensing coil mounting assembly shown in FIG. 1.

While the invention is susceptible to various modifications and alternative forms, specific embodiments thereof have been shown by way of example in the drawings and will be described in detail herein. It should be understood, however, that it is not intended to limit the invention to the particular forms described, but, on the contrary, the intention is to cover all modifications, equivalents and alternatives falling within the spirit and scope of the invention as defined by the appended claims.

Figure 4:
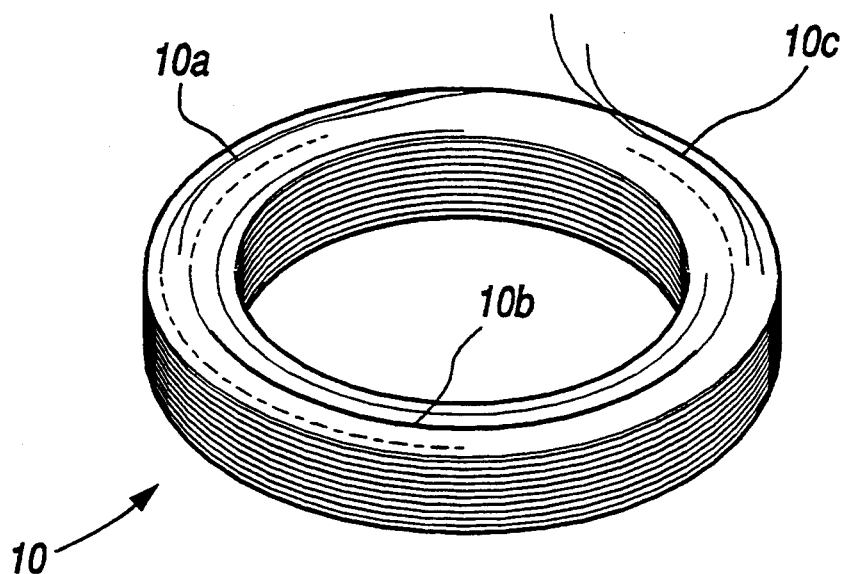
FIG. 4 is an enlarged perspective view of the sensing coil used in the assembly of FIGS. 1–3.

Turning now to the drawings and referring first to FIG. 1, a multi-turn coil 10 of optical fiber is disposed within a body of gel 11 contained in an annular cavity 12 formed by an aluminum housing 13. The coil 10 is preferably preformed and spliced to a directional coupler 10a (see FIG. 4) connected in series with a polarizer 10b and a second directional coupler 10c. The coil, the directional couplers, and the polarizer are then all submerged within the gel 11 with a length of the fiber at one end of the coil extending through a pair of holes 15a and 15b in the inner wall of the cavity 12 to form part of a piezoelectric phase modulator or PZT 14 mounted within a central cavity 15 formed by the housing 13. The two fibers at the end of the directional coupler most distal from the coil extend downwardly through a pair of slots 12a and 12b in the bottom wall of the cavity 12 for connection to a laser 16 and a photodetector 17 mounted on a printed circuit board (PCB) 18. The PCB 18 is attached to the lower portion of the housing 13 by a bottom plate 19 and a plurality of screws. Two additional PCBs 21 and 22 mounted above the housing 13 contain the power supply and signal processing circuitry for the gyroscope. The PCBs 21 and 22 are spaced from each other and from the housing 13 by two sets of spacer posts 23 and 24. All these elements are nested inside a protective cylinder 25 along with the housing 13 and the PCB 18, and then a top plate 26 closes the end of the cylinder 25. A plurality of screws are passed through the top plate 26, the two PCBs 21 and 22 and the spacer posts 23 and 24, and are threaded into the housing 13. Channels 27 and 28 in the outer wall of the housing accommodate a wiring harness (not shown) for interconnected the various PCBs.

To protect the optical fiber from forces exerted by acceleration and vibrations on the leads extending from the housing 13 to the laser 16 and the photodetector 17, the space between the PCB 18 and the bottom of the cavity 12 is preferably filled with the same gel used in the cavity 12. This additional gel holds the leads in stable positions between the cavity 12 and the PCB 18.

The optical fiber for forming the coil 10 is single-moded and preferably polarization-holding, such as a fiber having an elliptical polarization-maintaining core or the D-shaped fiber described in Dyott U.S. Pat. No. 4,669,814. Alternatively, stress-induced birefringent or high numerical aperture single-mode fiber may be used. The fiber preferably has a polymeric buffer coating on it, although other types of protective coatings may be employed if desired.

Figure 3C:
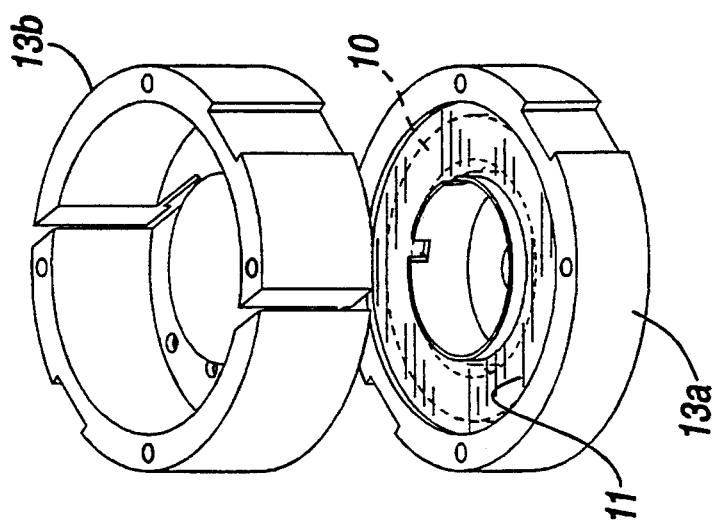
FIGS. 3a–3d are perspective views of certain of the elements shown in FIGS. 1 and 2, illustrating sequential stages in the assembly thereof.
Figure 3B:
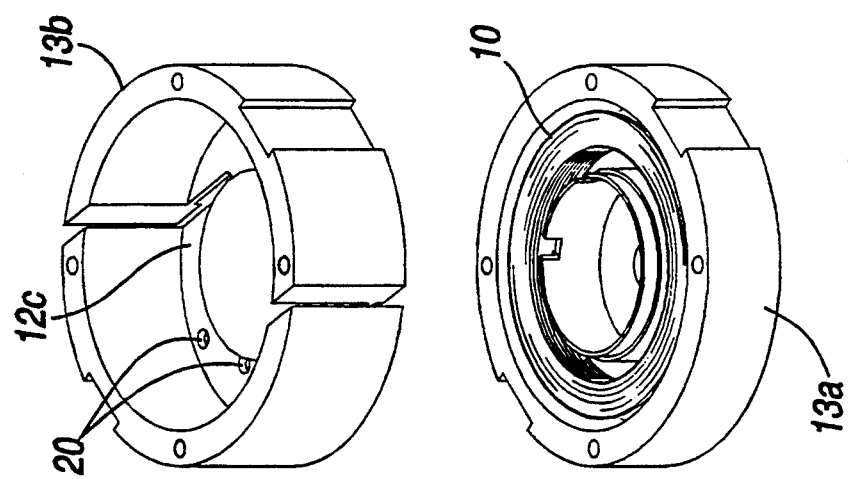
Figure 3A:
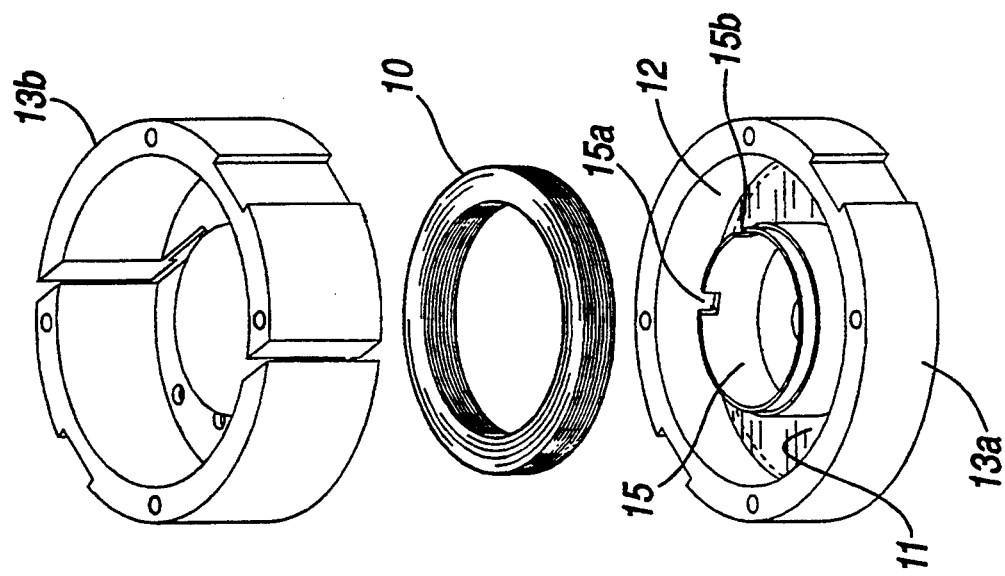
Figure 3D:
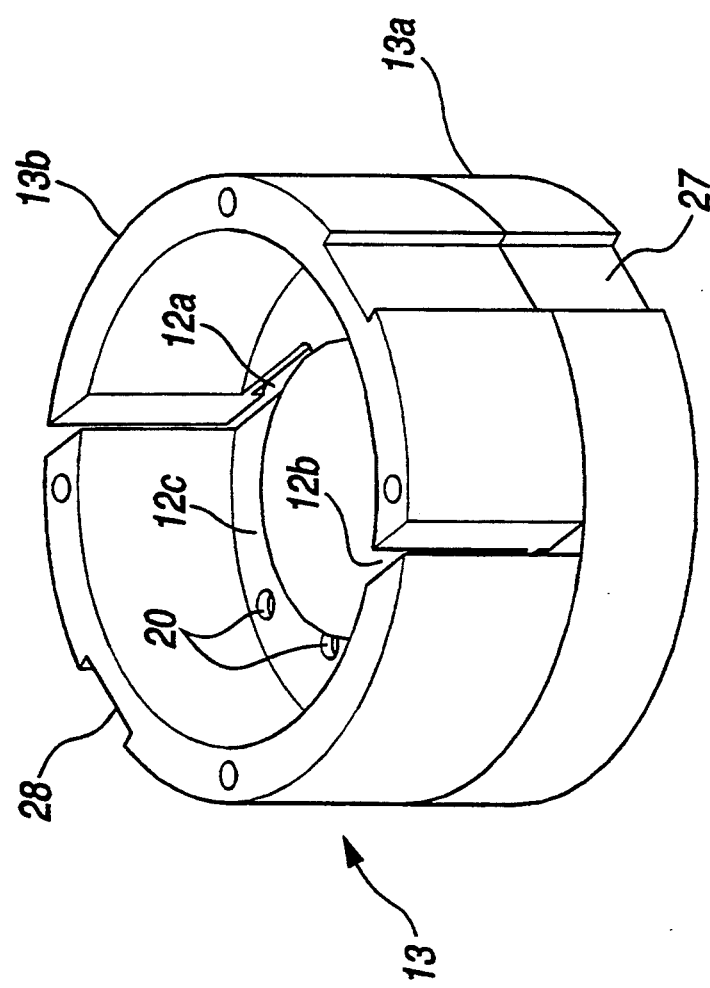

It will be noted that the body of the optical fiber coil 10 contacts only the gel 11, and thus is supported within the housing 13 solely by the gel 11. As shown in FIG. 3a, the gel is initially formed as a layer on the bottom wall of the cavity 12, while that bottom wall is held in a perfectly horizontal position. The upper surface of the gel layer is then perfectly level and horizontal, as is the coil 10 when it is placed on top of the gel layer. The housing 13 is made in two parts 13a and 13b to facilitate placement of the coil within the housing and the gel contained therein.

After the coil 10 has been placed on the bedding layer of gel in the housing part 13a, the second housing part 13b is attached to the first part, and then the rest of the cavity 12 is filled with additional gel though one of the expansion holes 20 described below. The additional gel envelopes the coil 10 and forms a unitary gelatinous mass with the bedding layer of gel. The entire mass of gel bonds to the inside walls of the cavity 12 as the gel solidifies. Thus the fiber coil 10 and its attached components (the directional couplers and the polarizer) are ultimately submerged completely within the gel 11, with the two free ends of the fibers forming the distal coupler exiting the gel through the slots 12a and 12b in the bottom wall of the cavity 12.

The fiber that forms the coil 10 is preferably coated with an oil or other lubricant to facilitate sliding movement of adjacent windings over each other as the coil relaxes after winding.

The stiffness or Young's modulus of the gel is sufficiently great to support the coil 10 in a fixed position within the housing 12. That is, the coil will not migrate in any direction, either rotationally, axially, or radially, within the mass of the gel. This fixed position of the coil must be maintained over the desired range of operating temperatures, which is typically from about −55° C. to about +85° C. The temperature at which a gel solidifies or changes to a brittle vitreous state is referred to as the glass transition temperature. For the purposes of this invention, the glass transition temperature should be below the operating temperature range of the gyroscope.

To accommodate expansion and contraction of the gel with changing temperature, one or more walls of the cavity 12 are preferably provided with recesses into which the gel may expand without subjecting the coil 10 to significant pressure changes. In the illustrated embodiment, the recesses are formed by a plurality of holes 20 in the cavity wall 12c. The effect of the holes 20 is to accommodate the change in volume of the gel 11 over the operating temperature range of the gyroscope, so that the gel expands and contracts through the holes 20 rather than significantly changing the pressure on the coil 10. As an alternative to the holes 20, the cavity walls can be formed in part of a flexible material, or the upper surface can be grooved. Another alternative is to embed one or more resilient compressible elements within the gel 11. Air bubbles may also be entrained in the gel.

If desired, the specific gravity of the gel 11 can be adjusted to approximate that of the coil 10. The coil typically has an effective specific gravity greater or less than 1.0, whereas the gel may have a specific gravity of about 1.0. The difference in the specific gravities can cause the coil-gel combination to act as a spring-mass system, which can result in spurious output signals from the gyroscope if the spring-mass system has a resonant frequency within the frequency range of a vibratory input. To avoid this problem, the gel may be loaded with solid or hollow silica microspheres. The loading of the gel also increases the viscosity and stiffness of the gel.

A coil of single-mode, polarization-holding optical fiber was tested while resting on a solid surface in air, and then while submerged in Dow Corning Q3-6575 silicone dielectric gel. The coil tested had a length of 250 meters. In each case the signal levels in the wanted and unwanted polarizations were measured at temperatures ranging from 85° C. to −55° C., and the extinction ratio ER was calculated. The extinction ratio ER of the coil varied from 25 to 19.2 in air, and from −24.5 to −19.5 in the gel.

Figure 5:
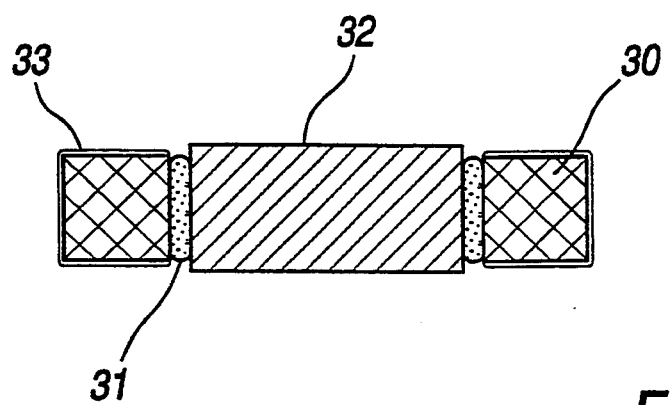
FIG. 5 is a vertical section of a modified sensing coil mounting assembly embodying the present invention.

In a modified embodiment of the invention illustrated in FIG. 5, an optical fiber coil 30 is wound on a layer of gel 31 on the surface of a rigid cylindrical bobbin 32. The gel 31 is the same type of gel used in the embodiment of FIGS. 1-4, and prevents the direct application of forces from the rigid bobbin to the coil 30. The outer surfaces of the coil 30 are coated with an adhesive 33 to hold the multiple windings of the coil together in a stable configuration.

Although the invention has been illustrated in the drawings as utilizing a circular coil, it should be understood that the coil may have other geometric shapes, such as elliptical or rectangular.

We claim:

1. In a fiber optic gyroscope, the improvement comprising a sensing coil of optical fiber submerged in a gel that surrounds and supports the sensing coil and a rigid housing containing the gel with the coil submerged therein, the walls of the housing being spaced away from the coil with the intervening space between the coil and the innermost housing walls being filled with the gel.

2. The fiber optic gyroscope of claim 1 wherein said gel has a Young's modulus that is substantially constant over the operating temperature range of the gyroscope.

3. The fiber optic gyroscope of claim 1 wherein said sensing coil is formed of single-mode, polarization-holding fiber.

4. The fiber optic gyroscope of claim 1 wherein said sensing coil is formed of high-numerical-aperture, single-mode fiber.

5. The fiber optic gyroscope of claim 1 wherein the glass transition temperature of said gel is below the operating temperature range of the gyroscope.

6. The fiber optic gyroscope of claim 1 wherein said gel is bonded to the walls of said housing.

7. The fiber optic gyroscope of claim 1 wherein the optical fiber forming said coil is coated with a lubricant.

8. A fiber optic gyroscope having a sensing coil of optical fiber submerged in a gel that surrounds and supports the sensing coil and a pair of directional couplers and a polarizer connected to said sensing coil, said directional couplers and polarizer also being submerged in and supported by said gel.

9. A method of forming a fiber optic gyroscope, comprising the steps of
forming a layer of gel on a flat horizontal surface that is perpendicular to the desired axis of rotation of said coil, so that the upper surface of the gel is parallel to said horizontal surface and, therefore, perpendicular to said desired axis of rotation,
placing said sensing coil on said upper surface of said gel layer, and
depositing additional gel on top of said coil to surround and cover the coil with gel, said additional gel merging with the initial layer of gel to form a single unitary mass of gel containing said coil.

10. The method of claim 9 wherein said gel is contained in a rigid housing.

11. A fiber optic gyroscope comprising
a sensing coil formed of single-mode, polarization-holding optical fiber,
a gel surrounding and supporting the sensing coil, and
a rigid housing containing the gel with the coil submerged therein, the walls of the housing being spaced away from the coil with the intervening space between the coil and the innermost housing walls being filled with the gel, the gel being bonded to said innermost housing walls, and said gel having a Young's modulus that is substantially constant over the operating temperature range of the gyroscope and a glass transition temperature that is below the operating temperature range of the gyroscope.

12. A fiber optic gyroscope comprising a sensing coil wound around a bobbin with a layer of gel disposed between the outer surface of the bobbin and the inner surface of the coil, and a coating of adhesive on the outside surface of the coil to hold the windings of the coil together in a stable configuration around the layer of gel.

13. The fiber optic gyroscope of claim 12 wherein said gel has a Young's modulus that is substantially constant over the operating temperature range of the gyroscope.

14. The fiber optic gyroscope of claim 12 wherein said sensing coil is formed of single-mode, polarization-holding fiber.

15. The fiber optic gyroscope of claim 12 wherein said sensing coil is formed of high-numerical-aperture, single-mode fiber.

16. The fiber optic gyroscope of claim 12 wherein the glass transition temperature of said gel is below the operating temperature range of the gyroscope.

17. A fiber optic gyroscope having a sensing coil of optical fiber submerged in a gel that surrounds and supports the sensing coil and a directional coupler connected to said sensing coil, said directional coupler also being submerged in and supported by said gel.

18. A fiber optic gyroscope having a sensing coil of optical fiber submerged in a gel that surrounds and supports the sensing coil and a directional coupler and a polarizer connected to said sensing coil, said directional coupler and polarizer also being submerged in and supported by said gel.

* * * * *